Aug. 6, 1935.    E. BUGATTI    2,010,623
SHOCK ABSORBER
Filed July 28, 1933    2 Sheets-Sheet 1
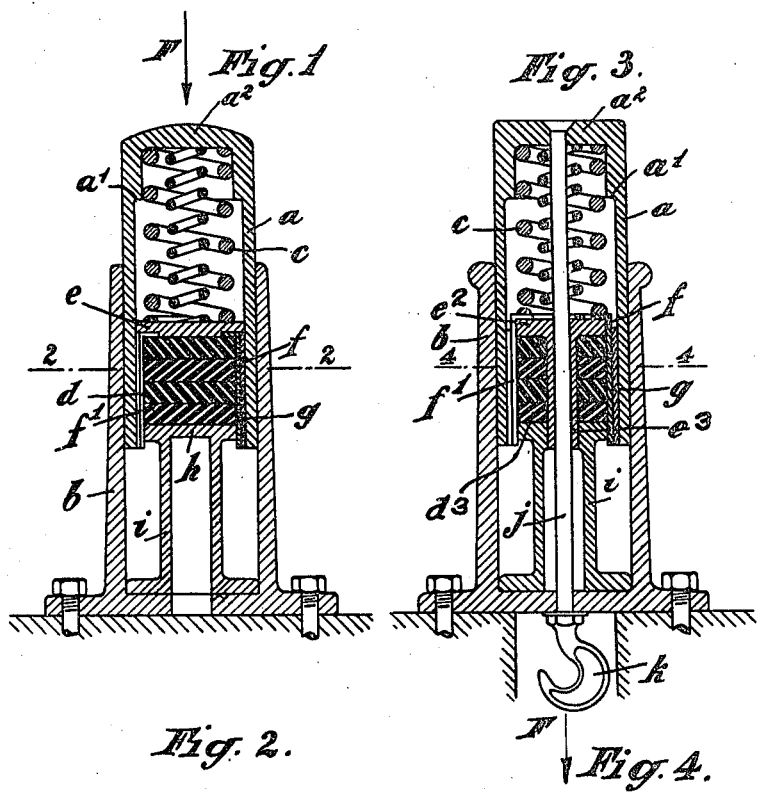
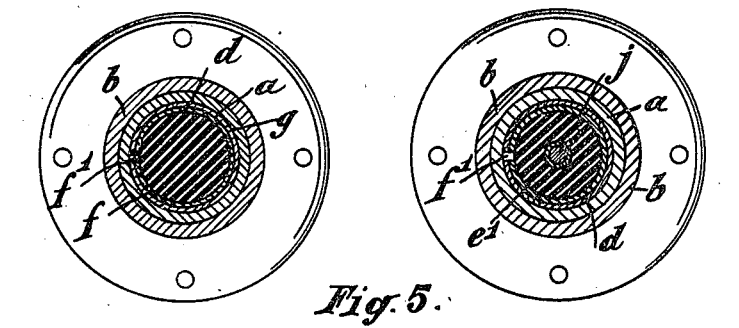
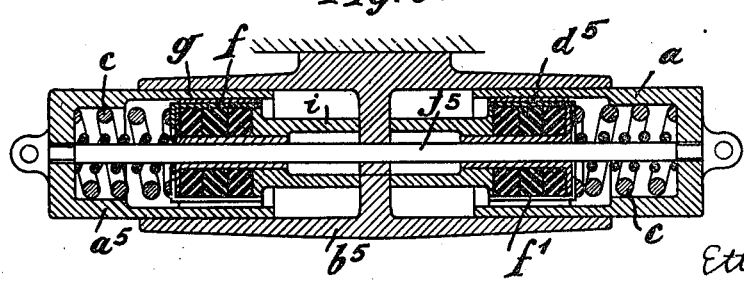
Inventor.
Ettore Bugatti
By Mauro & Lewis
Attorneys

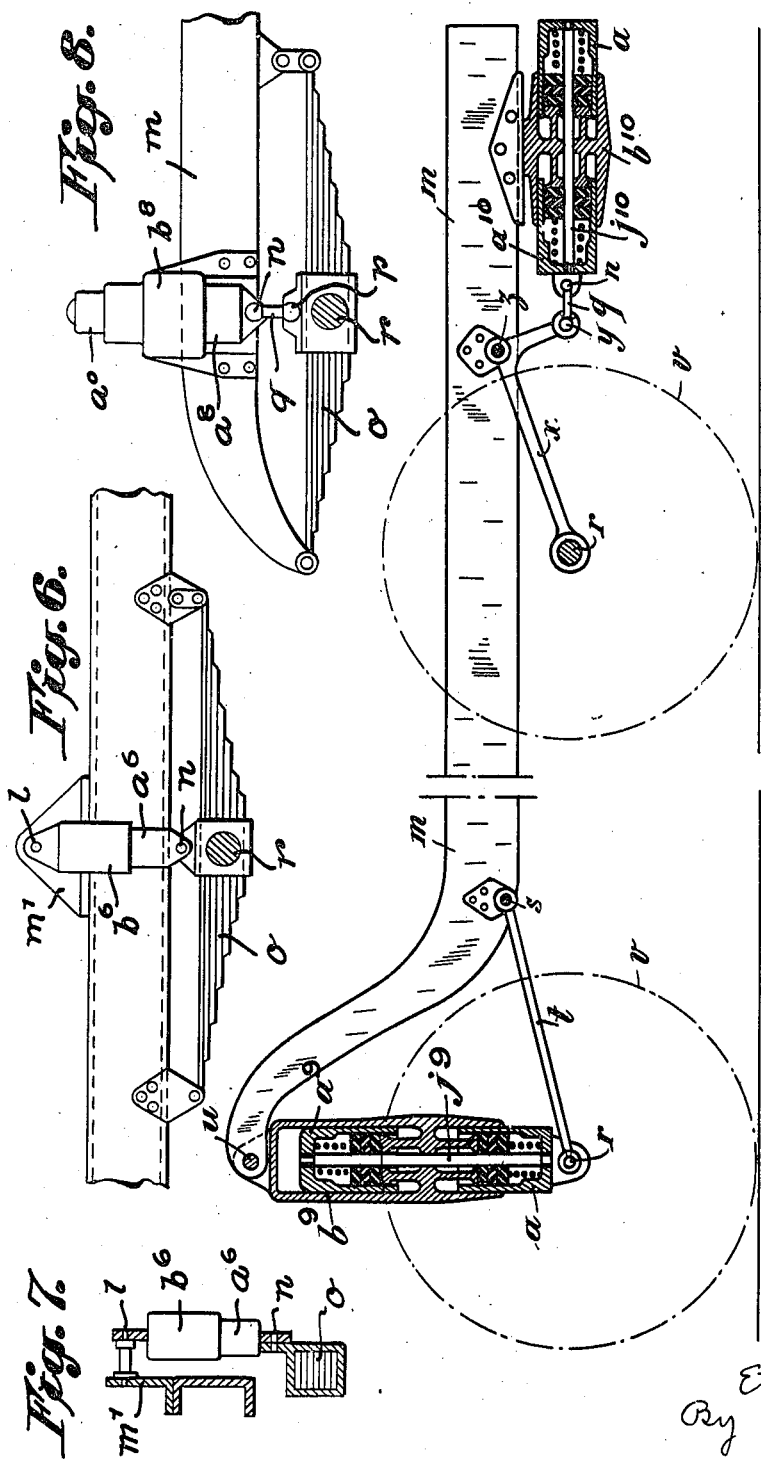

Patented Aug. 6, 1935

2,010,623

UNITED STATES PATENT OFFICE 2,010,623

SHOCK ABSORBER

Ettore Bugatti, Molsheim, France

Application July 28, 1933, Serial No. 682,703
In France August 30, 1932

5 Claims. (Cl. 267—9)

The present invention relates to shock absorbers such as are utilized, for instance, in connection with suspension systems for vehicles of any kind, bumpers, draw hooks, and generally speaking all mechanical systems in which it is desired to relieve the action of a spring by means of a shock absorber.

The object of the present invention is to provide an arrangement in which a yielding device for transmitting forces, and preferably an elastic one, such as a spring, is caused to cooperate with a rubber block or piston so as to obtain, owing to the properties of elasticity, deformability and incompressibility of rubber, a braking action proportional to the load and therefore to the stroke of said device.

This is explained by the fact that, if rubber is deformable and elastic, it is practically incompressible, which means that its volume remains substantially constant whatever be the deformations that it undergoes. If a block of rubber is flattened by compression in a direction parallel to one of three rectangular axes, it makes up for this contraction in one direction by expansion in the plane of the two other axes.

In a preferred embodiment of my invention, the force is transmitted by a spring to a rubber block surrounded by an expansible friction element so as to produce a frictional braking of the displacements of the members to be suspended, for instance of the draw hooks or bumpers, this braking action increasing with the compression of the spring.

Preferred embodiments of my invention will be hereinafter described with reference to the accompanying drawing given merely by way of example, and in which:

Fig. 1 is a longitudinal sectional view of a shock absorber adapted to transmit compressible forces;

Fig. 2 is a cross section on the line 2—2 of Fig. 1;

Fig. 3 is a longitudinal sectional view of a shock absorber for transmitting tractive forces;

Fig. 4 is a cross sectional view on the line 4—4 of Fig. 4;

Fig. 5 is a longitudinal section of a double shock absorber for transmitting both tractive and compressive forces;

Fig. 6 is an elevational view of a shock absorber of the type shown in Fig. 1 as applied to the suspension of a vehicle;

Fig. 7 is a front view, partly in section, of the suspension shown in Fig. 6;

Fig. 8 is an elevational view of a suspension comprising a spring associated with a double shock absorber of the kind shown in Fig. 5, but non-symmetrical.

Fig. 9 is an elevational view of a vehicle suspension embodying a double shock absorber of a kind analogous to that of Fig. 5;

Fig. 10 shows another embodiment of a suspension of a kind analogous to that of Fig. 9, but with the provision of a bell crank lever.

According to the embodiment of Figs. 1 and 2, a hollow cylinder $a$ closed at one of its ends $a^2$ is slidably mounted in a stationary hollow cylinder $b$. A stationary lower disc $h$ supported by the bottom of cylinder $b$ through an upright $i$, carries a rubber element $d$ consisting of one or several blocks of rubber.

Element $d$ is laterally surrounded by an expansible metallic envelope $f$ which is given the shape of a cylinder slit along one of its generatrices $f^1$, and the outer surface of which is provided with a friction member $g$. An upper movable disc $e$ is provided on the top of element $d$. Rubber element $d$ is thus wholly enclosed within the space limited by the lower disc $h$, the upper disc $e$ and the lateral envelope $f$, the latter being adapted to slide between the edge of lower disc $h$ and the inner wall of movable cylinder $a$.

The compressive force that is exerted on the end $a^2$ of movable cylinder $a$ in the direction of arrow F is transmitted to disc $e$ through compressing springs $c$ inserted in cylinder $a$ between its end $a^2$ and disc $e$.

The axial displacement of said cylinder $a$ relatively to stationary cylinder $b$ is limited by a circular shoulder $a^1$ adapted to come into contact with the edge of disc $e$. The operation of the shock absorber above described is the following:

Under the action of force $f$, cylinder $a$ is forced into cylinder $b$ which compresses springs $c$. These springs exert a certain pressure on disc $e$, so that rubber element $d$ is compressed in the longitudinal direction, but, due to the incompressibility of rubber, element $d$ expands transversely, that is to say increases in diameter. This expansion compels the extensible cylindrical envelope $f$ to also expand, and to be thus strongly applied against the inner wall of cylinder $a$ through frictional member $g$ which of course brakes the movement of cylinder $a$ relatively to element $d$ and therefore relatively to stationary cylinder $b$.

It will be understood that, under these conditions, the braking action will be the stronger as force F acting on the top of cylinder $a$ is greater. An almost ideal suspension is obtained since the deformability of the shock absorber is inversely proportional to the load. In particular, the oscillations of great amplitude which tend to set up in the suspensions of vehicles, at high speeds, are completely done away with by the shock absorbing device according to my invention.

The shock absorber shown in Figs. 3 and 4 differs from the one that has just been described only by the fact that force F' instead of being applied directly to the end $a^2$ of movable cylinder $a$, is applied below stationary cylinder $b$ through the intermediary of a draw-hook $k$. Hook $k$ transmits the force $f$ to the movable cylinder $a$ through the medium of a rigid rod $j$ which extends throughout the shock absorber and is rigidly fixed to the bottom $a^2$ of cylinder $a$. In order to allow rod $j$ to slide freely in the direction of the axis of rubber piston $d$, the upper disc $e^2$ provided on the top of said rubber elements $d^3$ is prolonged by a cylindrical sleeve $e^3$ which acts as a guide for rod $j$ through element $d$. The lower end of sleeve $e^3$ can slide freely through the lower disc $h$ and upright $i$.

The operation of the second embodiment of the shock absorber according to my invention that has just been described is identical to that of the first embodiment.

Fig. 5 is a longitudinal sectional view of a shock absorber including in combination two shock absorbers of the type shown in Figs. 3 and 4, disposed in opposite directions and having a common stationary cylinder $b^5$ and a common rod $j^5$. The relative displacements of rod $j^5$ with respect to cylinder $b^5$ are thus braked in either direction, and this shock absorber is of the double acting type. The rubber elements $d^5$ cause the displacements of casings $a^5$ with respect to cylinder $b^5$ to be braked.

In Fig. 5 it has been supposed that the two shock absorbing elements were symmetrical, but obviously one of the movable cylinders $a^5$ might be of a diameter smaller than the other one. Such an arrangement is shown in Fig. 8 in which the stationary cylinder $b^8$ includes a portion of smaller diameter corresponding to the diameter of said cylinder $a^5$. This embodiment of my invention has been shown in Fig. 8.

Figs. 6 and 7 show a suspension device for connecting a frame $m$ with an axle $r$ by means of a laminated spring $o$ associated with a simple shock absorber of the type shown in Figs. 1 and 2. Cylinder $b^6$ is pivoted at $l$ to a support $m^1$ rigidly carried by frame $m$. Cylinder $a^6$ is pivoted at $n$ to a member rigidly carried by the axle or by a spring $o$.

Fig. 8 shows a similar suspension but with a different mounting. Cylinder $b^8$ is no longer pivoted to frame $m$ but is rigidly fixed thereto. It is then necessary, in order to obtain the desired freedom of movement, to connect cylinder $a^8$ to axle $r$ or to spring $o$ through a connecting rod $q$ pivoted at $n$ to cylinder $a^8$ and at $p$ to a part rigidly fixed to axle $r$ or to spring $o$.

The shock absorber utilized with this kind of mounting can be either of the simple type or of the double acting type (for instance of the type of Fig. 5 as shown in Fig. 8).

Figs. 9 and 10 show two embodiments of suspension systems making use only of shock absorbers of the double acting type without any suspension springs.

In the embodiment of Fig. 9, the axle $r$ of the wheel diagrammatically illustrated at $v$ is connected to frame $m$ by a rod $t$ pivoted at $s$ to said frame. On the other hand, the rod $j^9$ of a double acting shock absorber having a substantially vertical axis is jointed at one of its ends to axle $r$ and the cylinder $b^9$ of the shock absorber in which both of the elements $a^9$ are slidably mounted is pivoted at $u$ to frame $m$.

A jointed triangle $urs$, one of the sides of which is elastic since it consists of the shock absorber, is thus obtained.

Fig. 10 is a view of another embodiment of the suspension device according to my invention in which the cylinder $b^{10}$ of the shock absorber in which both of the elements $a^{10}$ are slidably mounted is no longer pivoted to frame $m$, but rigidly fixed to said frame, said shock absorber being now disposed parallel to the frame.

Under these conditions, the displacements of axle $r$ are transmitted, through a bent lever $x$ acting as a bell crank and pivoted at $z$ to frame $m$, to a connecting rod $q$ jointed at $y$ to lever $x$, and at $n$ to the end of rod $j^{10}$ of the shock absorber.

The braking system devices that have been above described are not limited to their application to suspension devices of any kind; they can also be used for braking the recoil of guns and other fire-arms; for the coupling, either automatically or not, of railway vehicles, etc. In the last mentioned case, it will be advantageous to utilize a shock absorber of the double acting type, one of the elements serving to absorb the shocks and the other acting as a drawing device.

On the other hand, it is possible, according to my invention, to combine several simple shock absorbers of the types shown in Figs. 1 and 2, by placing them for instance in opposite relation for increasing their braking power.

While I have described what I deem to be practical and efficient embodiments of my invention it should be well understood that I do not wish to be limited thereto as there might be changes made in the arrangement, disposition and form of the parts without departing from the principle of my invention as comprehended within the scope of the appended claims.

What I claim is:

1. A shock absorber of the type described which comprises in combination two cylinders adapted to slide longitudinally within each other, the inner cylinder being closed at the end thereof that is outside the other cylinder, a disc within the outer cylinder rigidly fixed thereto, a rubber block butting longitudinally against said disc, a longitudinally slit metallic sleeve surrounding the lateral surface of said block, a friction element around said sleeve, the block being so dimensioned that the friction element is slidably applied with a close fit against the inner lateral surface of the inner cylinder, another disc applied against said rubber block on the other side thereof from the first mentioned disc, at least one spring interposed between the last mentioned disc and the closed end of the inner cylinder for opposing relative longitudinal displacements of said cylinders toward each other, whereby a longitudinal flattening of said block due to a relative movement of said cylinders between each other causes a transversal expansion of said block and an increased friction between the friction element and the lateral wall of the inner cylinder, thus braking the sliding displacement of said block with respect to said inner cylinder, a rod rigidly fixed to the closed end of the inner cylinder and extending axially throughout said rubber block and the outer cylinder, a sleeve integral with the second mentioned disc and extending throughout said rubber block for guiding said rod, and means, at the end of said rod for exerting a tractive force thereon.

2. A shock absorber of the type described, which comprises in combination, a support, two cylinders each closed at one end slidably mounted in said support in line with each other so that their closed ends are located outwardly, a deformable and incompressible element mounted with a close fit against the lateral surface of each of these cylinders respectively, rigid means for longitudinally connecting each of said elements with said support, rigid means for longitudinally connecting together said two cylinders, and elastic means interposed between each element and the closed end of the corresponding cylinder for opposing relative displacements of said element with respect to said cylinder.

3. A shock absorber of the type described, which comprises in combination, a support, two cylinders each closed at one end slidably mounted in said support in line with each other so that their closed ends are located outwardly, a deformable and incompressible element mounted with a close fit against the lateral surface of each of these cylinders respectively, rigid means for longitudinally connecting each of said elements with said support, elastic means interposed between each element and the closed end of the corresponding cylinder for opposing relative displacements of said element with respect to said cylinder, and a rod fixed at both ends to the closed ends of the two cylinders respectively and extending throughout said elements.

4. A shock absorber of the type described which comprises in combination, a cylinder, two cylinders each closed at one end slidably mounted in said first mentioned cylinder in line with each other so that their closed ends are located outwardly, two discs, both rigidly carried by said first mentioned cylinder and each located inside each of the second mentioned cylinders respectively, a rubber block butting longitudinally against each of said discs, a longitudinally slit metallic sleeve surrounding the lateral surface of each block, a friction element around said sleeve, the blocks being so dimensioned that the friction elements are slidably applied with a close fit against the inner lateral surfaces of the corresponding cylinders, another disc applied against each of said rubber blocks on the other side thereof from the first mentioned disc, at least one spring interposed between each of the last mentioned discs and the closed end of the corresponding cylinders, and a rod fixed at both ends to the closed ends of the two second mentioned cylinders respectively and extending throughout said rubber blocks.

5. A shock absorber of the type described which comprises in combination two cylinders adapted to slide longitudinally within each other, the inner cylinder being closed at the end thereof that is outside the other cylinder, a disc within the outer cylinder rigidly fixed thereto, a rubber block butting longitudinally against said disc, a longitudinally slit metallic sleeve surrounding the lateral surface of said block, a friction element around said sleeve, the block being so dimensioned that the friction element is slidably applied with a close fit against the inner lateral surface of the inner cylinder, another disc applied against said rubber block on the other side thereof from the first mentioned disc, at least one spring interposed between the last mentioned disc and the closed end of the inner cylinder for opposing relative longitudinal displacements of said cylinders toward each other, a shoulder provided on the inner wall of the inner cylinder and adapted to bear against the second mentioned disc, for limiting the longitudinal sliding displacements of the two cylinders toward each other, whereby a longitudinal flattening of said block due to a relative movement of said cylinders between each other causes a transversal expansion of said block and an increased friction between the friction element and the lateral wall of the inner cylinder, thus braking the sliding displacement of said block with respect to said inner cylinder.

ETTORE BUGATTI.